Jan. 5, 1932.                    A. RAVA                    1,839,499
                          VEHICLE SIGNAL DEVICE
                          Filed Nov. 26, 1928
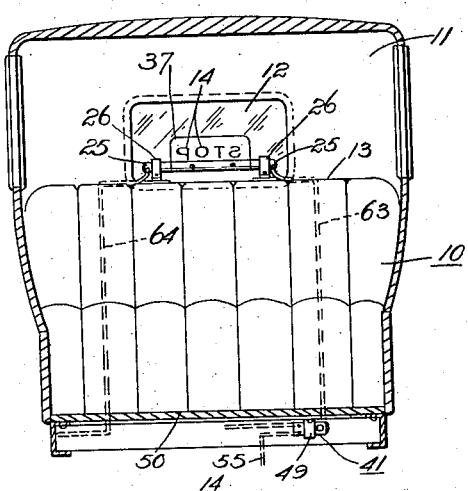
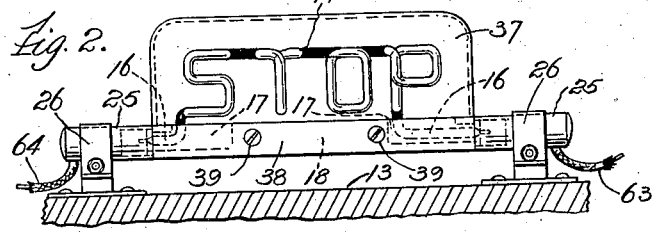
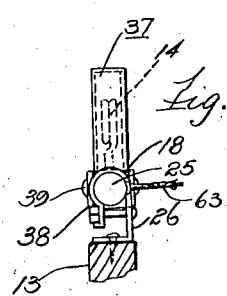
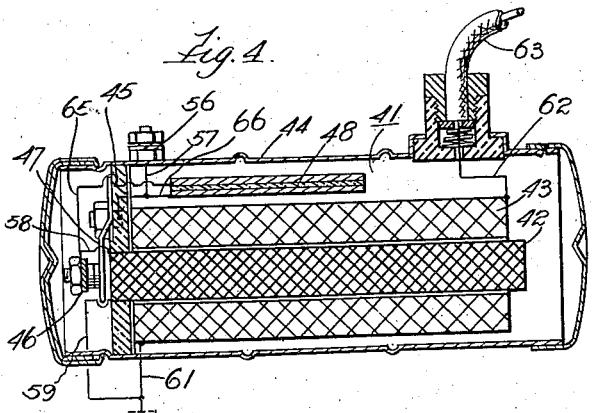
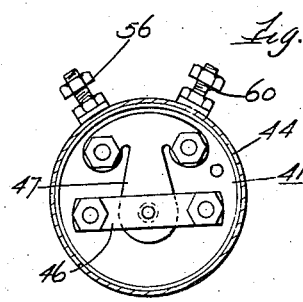
Inventor
Alexander Rava.
by his Attorneys.

Patented Jan. 5, 1932

1,839,499

UNITED STATES PATENT OFFICE

ALEXANDER RAVA, OF CHICAGO, ILLINOIS, ASSIGNOR TO STEWART-WARNER CORPORATION, OF CHICAGO, ILLINOIS, A CORPORATION OF VIRGINIA

VEHICLE SIGNAL DEVICE

Application filed November 26, 1928. Serial No. 321,901.

This invention relates to vehicle signal devices, and more particularly to a device of the type for visibly warning the drivers of following vehicles of a contemplated change in motion, such as stopping or turning. An object of the invention is to provide a device of novel construction including words or symbols formed of luminescent tubing, conveniently mounted in the interior of an automobile (especially adaptable to those of the "closed" design) immediately in front of the rear window in a position insuring its being visible at all times by drivers of following vehicles. Another object is to provide an improved mounting for a device of this character such that the entire unit is swivelled in its supports to swing away from the window so as to give an unobstructed view through the same, or to permit cleaning the window and the device. A further object is to provide a transparent protective casing for the sign of luminescent tubing, mounted for movement therewith as a unit. The invention consists in certain features and elements of construction, herein shown and described, as indicated by the claims.

In the drawings:

Figure 1 is a transverse sectional view through an automobile body, showing the signal device embodying the present invention, mounted in operative position.

Figure 2 is an enlarged rear view of the signal in mounted position; the back of the vehicle being omitted.

Figure 3 is an end view of the device.

Figure 4 is a sectional view through an induction coil used in connection with my device, with conductor wiring shown diagrammatically.

Figure 5 is a sectional view taken through the cap, showing the circuit interrupter.

Figure 6 is an enlarged axial section through a trunnion supporting bearing with the lead-in-wire terminal.

Figure 7 is a transverse section taken as indicated at line, 7—7 on Figure 6.

The signal device embodying the present invention may be used in connection with practically all types of passenger automobiles, but is especially suited to the "closed" design having a fixed or permanent back. In the drawings the rear portion of a "closed" type automobile is indicated at 10, having a fixed back, 11, provided with the usual rear window, 12. Mounted on the window sill, 13, on the inside of the vehicle parallel to and closely adjacent the window is the signal device which comprises luminescent tubing, 14, shaped to form words or symbols, etc., herein shown forming the letters of the word "Stop". The luminescent tube is in general of the same conventional design as the well known "neon" signs wherein Neon or other gases are rendered luminous by passing an electric current therethrough. The ends of the tube are drawn and sealed to retain the gas therein and each end has an electrode, 15, with one end protruding into the tube and the other end freely exposed for contact with a source of electrical energy. The portions, 16, of tubing just inwardly of the drawn ends, preferably are shaped for seating in recessed pockets, 17, formed adjacent each end and in the upper side of a supporting block, 18, of insulating material such as a phenolic condensation product. These portions of the tube are permanently secured in the recesses by any suitable material such as pitch or a phenolic condensation product, thus supporting the sign in fixed relation to the block, 18.

The pockets formed in the block, 18, connect with cylindrical bores, 21, opening centrally at the outer ends thereof. The extreme ends of the block are reduced to form cylindrical supporting trunnions, 22, each having force-fitted thereon a metal terminal cap or thimble, 23, which encloses or houses a quantity of tin-foil, 24, in the bore, 21, surrounding the exposed portion of the electrode, 15, as seen in Figure 6. This arrangement insures positive and rigid support for the luminescent tubing and also provides neat and compact terminal connections therefor. The caps or thimbles, 23, are adapted to be rotatably mounted in the counterbored ends of a pair of trunnion bearings, 25, which are clamped in brackets, 26, mounted on the sill, 13. These trunnion bearings, 25, are formed of some suitable insulating material such as a phenolic condensation product and are each provided with chambered portions, 27, opening into the counterbored ends thereof. Mounted in each chamber is a swivel terminal for connection with the tubing, comprising a plunger, 29, slidably carried in a bracket clip, 30, disposed in the chamber, 27, with the extreme end of the clip in contact with the inner end of said chamber. The plunger is formed with a blade-like head, 31, adapted to engage in a co-operating slot, 32, formed in the outer end of the cap or thimble, 23, and is frictionally held in yielding contact therewith by a coil spring, 33, encircling the plunger and interposed between a shoulder of the bracket clip, 30, and a shoulder, 34, of said plunger, thereby normally tending to urge said terminal plunger against the cap or thimble, 23. It will be apparent that the spring-pressed swivel terminals, 29, may be designed to provide sufficient frictional resistance against the shoulders, 34, or the trunnion bearing members, 25, may be adjusted axially in their brackets, 26, to press frictionally against the ends of the supporting block, 18, so that the friction will maintain the sign in any desired position of angular adjustment. Further, this mounting permits swinging the sign unit about its axis to a horizontal position to afford an unobstructed view through the window, 12, or to permit easy access for cleaning.

Adjacent the closed end of each trunnion bearing, 25, a suitable opening is provided to permit insertion of a lead-in wire which is secured therein in contact with the clip, 30. Thus the portion of the circuit between the lead-in wires is completed through the neon gas electrodes, 15, tin-foil, 24, terminal caps, 23, plungers, 29 and the clips, 30.

Fully enclosing the luminescent tubing is a protective housing or casing, 37, of transparent or transluscent material. The casing is of rectangular outline having its front and back walls extended downwardly on opposite sides of the supporting block, 18, and these extended or marginal portions are enclosed by a clamping strip, 38, of U-shaped cross section which is fitted around the bottom of the block by the screws, 39. Thus the casing is provided proper reinforcement, and is adapted to be moved bodily with the sign as a unit, about the trunnions.

Inasmuch as the electric current for illuminating neon gas in constructions of this character must be of relatively high ferquency, and since the average automobile is fitted with a storage battery of low voltage, I provide an induction coil, 41, for "stepping-up" the voltage. This induction coil includes the usual primary coil, 42, and secondary coil, 43, housed in a casing, 44. An insulating disk, 45, is positioned in the casing adjacent one end of the coils, and has secured thereto a circuit interrupter comprising a fixed terminal, 46, and a movable terminal, 47. A condenser, 48, conveniently mounted in the casing is connected in the circuit for bridging the circuit interrupter. The entire induction coil may be mounted at any suitable place and is shown in Figure 1 conveniently carried in a bracket, 49, secured to the under side of the floor boards, 50, of the vehicle.

The electric circuit may be briefly described as follows: The battery (not shown) has one of its terminals grounded to the vehicle chassis in the usual manner and the other terminal is connected by a conductor, 55, to a terminal, 56, on the induction coil casing, from which terminal a conductor, 57, is connected to the movable terminal, 47, of the circuit interrupter. A conductor, 58, connects the fixed terminal, 46, of the circuit interrupter to one end of the primary coil, the other end being connected by a conductor, 59, to the casing terminal, 60, which is grounded to the chassis. One end of the secondary coil is connected by a conductor, 61, to the terminal, 60, and the other secondary coil terminal is connected by conductor, 62, to the lead-in wire, 63, which is attached to one of the terminals of the sign. The other lead-in wire, 64, of the sign is grounded to the chassis, thus completing the circuit. A conductor wire, 65, connects one terminal of the condenser to the fixed interrupter terminal, 46, and the other condenser terminal is connected by conductor wire, 66, to the movable interrupter terminal, 47. A suitable switch (not shown) may be interposed in the line for convenient manipulation by the driver, preferably in conjunction with his actuation of clutch or brake pedal.

My signal device is compact, and of simplified construction, and being mounted in registration with the rear window of an automobile, it will be plainly visible to the operators of following vehicles. This is especially advantageous in congested traffic, where a stop signal is of paramount importance.

I claim:—

1. A signal lamp including a sign consisting of a word or symbol formed of luminescent tubing, and mounting means therefor arranged inside of a vehicle body for supporting said sign in registration with a window, said means including trunnions at opposite ends of the sign to permit swinging said sign away from and substantially out of registration with said window.

2. A signal lamp including a supporting member, a sign consisting of a word or symbol formed of luminescent tubing and rigidly secured to said member, said tubing being provided with electrodes at each end communicating with its interior, and means arranged inside of a vehicle body for supporting said sign in registration with a rear window, said means including trunnion connections with the supporting member to permit swinging of the sign toward or away from the window, said trunnion connections each including electrical terminals connecting said electrodes of the sign with lead-in wires of a source of electrical energy.

3. A signal lamp including a supporting member, a sign consisting of a word or symbol formed of luminescent tubing and rigidly secured to said member, said tubing being provided with electrodes at each end communicating with its interior, and means arranged inside of a vehicle body for supporting said sign in registration with a rear window, said means including trunnions in the form of terminal caps on the opposite ends of the supporting member and journaled in fixed bearings to permit swinging of the sign toward or away from the window, said terminal caps having electrical contact with said electrodes, and conducting means in contact with said terminal caps and connected to lead-in wires for completing the electrical circuit.

4. A signal lamp including a supporting member, a sign consisting of a word or symbol formed of luminescent tubing and rigidly secured to said member, said tubing being provided with electrodes at each end communicating with its interior, and means arranged inside of a vehicle body for supporting said sign in registration with a rear window, said means including trunnion connections with the supporting member including fixed trunnion bearings of insulating material at each end of the supporting member, terminal trunnion caps at each end of said member rotatively held in said bearings, metallic packing interposed between the electrodes and the terminal caps to provide electrical contact therewith, and conductors carried in said fixed bearings in contact with said terminal caps and connected to lead-in wires for completing the electrical circuit.

5. In the combination defined in claim 3, said conducting means in the fixed bearings each including a support, and a plunger rotatable therein, said plunger and terminal cap having interengaging features whereby said plunger is rotated in its support upon swinging of the sign on its trunnions.

6. In the combination defined in claim 3, said conducting means in the fixed bearings each including a support, and a plunger rotatable therein, said plunger and terminal cap having interengaging features whereby said plunger is rotated in its support upon swinging of the sign on its trunnions, together with yielding means normally urging said plunger axially into contact with the terminal cap, and providing frictional resistance for maintaining said sign at any desired position of angular adjustment.

7. A signal lamp including a sign consisting of a word or symbol formed of luminescent tubing, a base block in which the ends of the tubing are anchored below the word or symbol, a protective cover of transparent material comprising front and back walls disposed in substantially parallel planes between which the tubing extends, means joining said front and back walls at their upper and lateral edges, the lower marginal portion of said walls being secured to the base block whereby a transparent housing is provided for the luminescent signal.

ALEXANDER RAVA.